United States Patent [19]

Balch et al.

[11] Patent Number: 4,634,887

[45] Date of Patent: Jan. 6, 1987

[54] LOAD RATE LIMITING MEANS FOR A LOCOMOTIVE ENGINE

[75] Inventors: Edgar T. Balch; Richard E. Bilski; Ajith K. Kumar, all of Erie, Pa.

[73] Assignee: General Electric Company, Erie, Pa.

[21] Appl. No.: 747,628

[22] Filed: Jun. 24, 1985

[51] Int. Cl.[4] .................................................. B601 11/02
[52] U.S. Cl. .................................. 290/3; 290/40 R; 290/40 B; 290/40 C; 60/39.281; 322/15; 364/431.07
[58] Field of Search ................ 290/40 R, 40 B, 40 C, 290/40 E, 40 F, 3, 14; 60/39.281; 322/14, 15; 364/431.07

[56] References Cited

U.S. PATENT DOCUMENTS

| | | | |
|---|---|---|---|
| 3,370,218 | 2/1968 | Merz | 322/15 |
| 3,878,400 | 4/1975 | McSparran | 290/14 |
| 4,322,630 | 3/1982 | Mezera et al. | 290/40 C |
| 4,458,319 | 7/1984 | Chujo et al. | 364/431.06 |
| 4,461,985 | 7/1984 | Stitt | 318/727 |
| 4,482,813 | 11/1984 | Lerouge et al. | 290/40 R |
| 4,529,887 | 7/1985 | Johnson | 290/40 B |

Primary Examiner—B. Dobeck
Attorney, Agent, or Firm—Albert S. Richardson, Jr.

[57] ABSTRACT

The propulsion control system of a diesel-electric locomotive includes means responsive to the rotational speed and the gross horsepower of a locomotive engine for controlling the rate at which traction load is added to the engine, when more load is called for, so that the loading rate will increase (between predetermined minimum and maximum limits) as the product of speed and horsepower increases. The loading rate is also increased in response to the ratio of combustion air to diesel fuel increasing above a predetermined no-smoke threshold.

17 Claims, 7 Drawing Figures

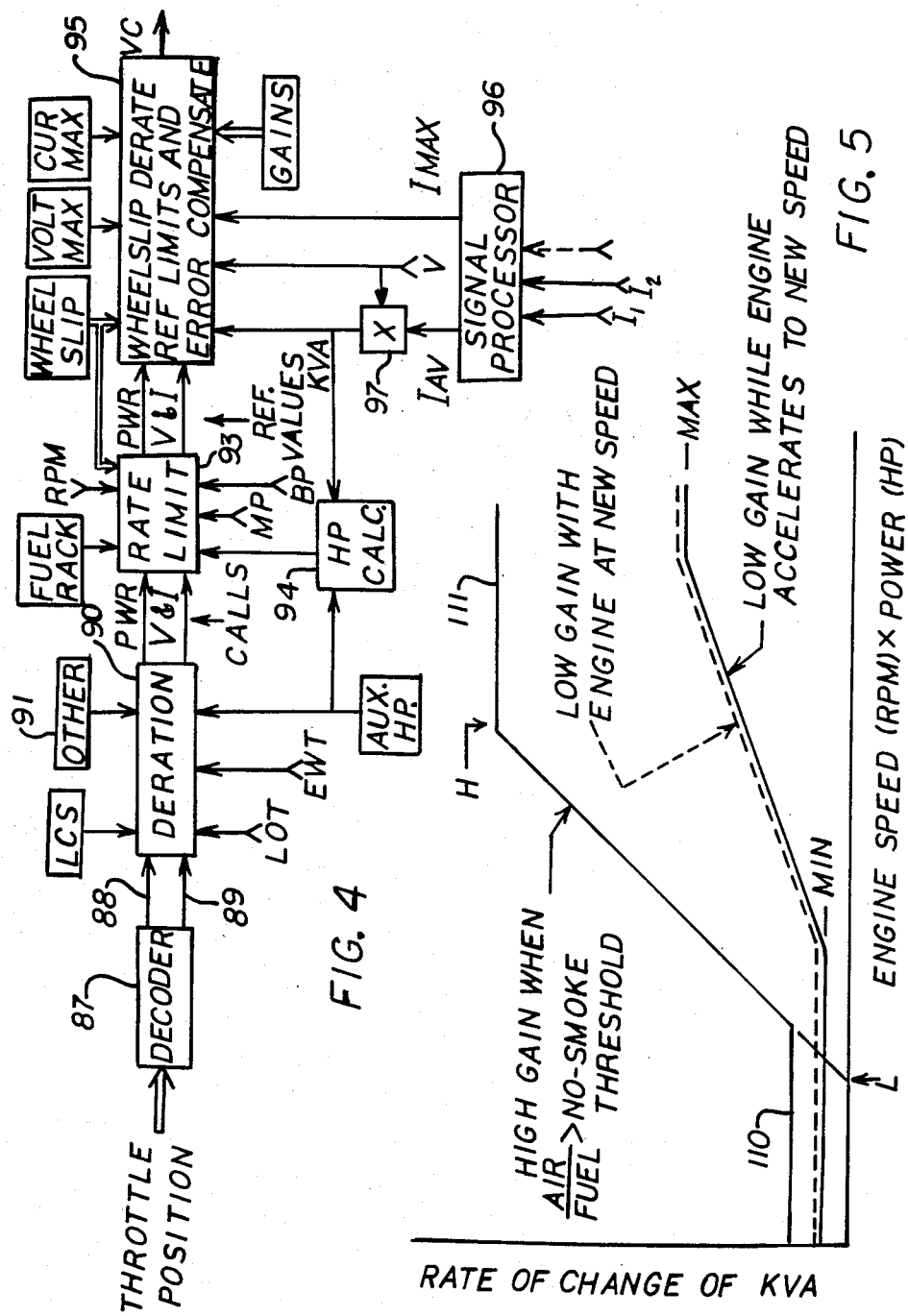

LOAD RATE LIMITING MEANS FOR A LOCOMOTIVE ENGINE

BACKGROUND OF THE INVENTION

This invention relates generally to diesel-electric traction vehicles such as locomotives that have turbocharged diesel engines on board, and it relates more particularly to improved means for preventing undesirable smoke in the exhaust of a locomotive engine when the engine speed and/or load is increased.

Large self-propelled traction vehicles such as locomotives commonly use a thermal prime mover (typically a 16-cylinder turbocharged diesel engine) to drive an electrical transmission comprising generating means for supplying electric current to a plurality of direct current (d-c) traction motors whose rotors are drivingly coupled through speed-reducing gearing to the respective axle-wheel sets of the vehicle. The generating means typically comprises a main 3-phase traction alternator whose rotor is mechanically coupled to the output shaft of the engine. When excitation current is supplied to field windings on the rotating rotor, alternating voltages are generated in the 3-phase stator windings of the alternator. These voltages are rectified and applied to the armature windings of the traction motors.

During the "motoring" or propulsion mode of operation, a locomotive diesel engine tends to deliver constant power, depending on throttle setting and ambient conditions, regardless of locomotive speed. For maximum performance, the electrical power output of the traction alternator must be suitably controlled so that the locomotive utilizes full engine power. For proper train handling, intermediate power output levels are provided to permit graduation from minimum to full output. But the load on the engine must not exceed whatever level of power the engine can develop. Overloads can cause premature wear, engine stalling or "bogging," excessive exhaust smoke, or other undesirable effects. Historically, locomotive control systems have been designed so that the operator can select the desired level of traction power, in discrete steps between zero and maximum, and so that the engine develops whatever level of power the traction and auxiliary loads demand.

Engine horsepower is proportional to the product of the angular velocity at which the crankshaft turns and the torque opposing such motion. For the purpose of varying and regulating the amount of available power, it is common practice to equip a locomotive engine with a speed regulating governor which adjusts the quantity of pressurized diesel fuel (i.e., fuel oil) injected into each of the engine cylinders so that the actual speed (RPM) of the crankshaft corresponds to a desired speed. The desired speed is set, within permissible limits, by a manually operated lever or handle of a throttle that can be selectively moved in eight steps or "notches" between a low power position (N1) and a maximum power position (N8). The throttle handle is part of the control console located in the operator's cab of the locomotive. (In addition to the eight conventional power notches, the handle has an "idle" position and a "shutdown" position).

The position of the throttle handle determines the engine speed setting of the associated governor. In a typical governor system, the output piston of an electrohydraulic device is drivingly connected, via a mechanical linkage, to a pair of movable fuel pump racks which in turn are coupled to a plurality of fuel injection pumps that respectively meter the amounts of fuel supplied to the power cylinders of the engine. The governor compares the desired speed (as commanded by the throttle) with the actual speed of the engine, and its output piston moves the fuel racks as necessary to minimize any deviation therebetween.

For each of its eight different speed settings, the engine is capable of developing a corresponding constant amount of horsepower (assuming maximum output torque). When the throttle notch 8 is selected, maximum speed (e.g., 1,050 rpm) and maximum rated gross horsepower (e.g., 4,000) are realized. Under normal conditions the engine power at each notch equals the power demanded by the electric propulsion system which is supplied by the engine-driven main alternator plus power consumed by certain electrically and mechanically driven auxiliary equipments.

The output power (KVA) of the main alternator is proportional to the product of the rms magnitudes of generated voltage and load current. The voltage magnitude varies with the rotational speed of the engine, and it is also a function of the magnitude of excitation current in the alternator field windings. For the purpose of accurately controlling and regulating the amount of power supplied to the electric load circuit it is common practice to adjust the field strength of the traction alternator to compensate for load changes and minimize the error between actual and desired KVA. The desired power depends on the specific speed setting of the engine. Such excitation control will establish a balanced steady-state condition which results in a substantially constant, optimum electrical power output for each position of the throttle handle.

In practice the above-summarized system of controlling a diesel-electric locomotive also includes suitable means for overriding normal operation of the system and reducing engine load in response to certain temporary abnormal conditions, such as loss of wheel adhesion, low pressure in the lubricating oil system or the engine coolant system, or a load exceeding the power capability of the engine at whatever speed the throttle is commanding. This response, which is generally referred to as "deration," helps the locomotive recover from such conditions and/or prevents serious damage to the engine. In addition, the excitation control system conventionally includes means for limiting or reducing alternator output voltage as necessary to keep the magnitude of this voltage and the magnitude of load current from respectively exceeding predetermined safe maximum levels or limits. Current limit is effective when the locomotive is accelerating from rest. At low locomotive speeds, the traction motor armatures are rotating slowly, so their back emf is low. A low alternator voltage can now produce maximum load current which in turn produces the high tractive effort required for acceleration. On the other hand, the alternator voltage magnitude must be held constant at its maximum level whenever locomotive speed is high. At high speeds the traction motor armatures are rotating rapidly and have a high back emf, and the alternator voltage must then be high to produce the required load current.

To increase the maximum amount of useful power that a locomotive engine of given size can develop when running at a given speed, it is usual practice to equip the engine with a supercharger. For a 4-stroke diesel engine (which hereinafter is assumed), it is advantageous to use a free-wheeling centrifugal supercharger (commonly known as a turbocharger) the rotor assembly of which is driven by the engine exhaust gases. The turbocharger raises the air pressure in the intake manifold of the engine, whereby each cylinder is supplied with more fresh air during the intake stroke of its piston. This permits more fuel to be burned in the cylinder, and therefore the expanding products of combustion will exert more force on the piston during each power stroke.

When the throttle handle of the above-summarized locomotive is advanced from a relatively low notch to a higher power notch, the engine speed governor responds by immediately increasing the amount of fuel injected into the engine cylinders in an attempt to increase engine speed to the new speed as set by the throttle. At the same time, the throttle commands the excitation control system to strengthen the field of the traction alternator so that the traction load on the engine will increase to whatever magnitude is determined by the new throttle setting. However, the rate at which the load is actually applied needs to be controlled in order to prevent engine bogging and undesirable smoke.

A finite period of time is required for a large diesel engine to accelerate from a relatively low speed to a higher speed. During this period an appreciable portion of the power developed by the engine is being used to raise the angular velocity of the engine crankshaft and the rotating mass that it drives. During the same period the speed of the free-wheeling turbocharger proportionately lags behind the speed of the accelerating engine, particularly so while the traction load is relatively light. (The turbo speed, and hence the amount of combustion air supplied to the intake manifold, depends on the energy in the engine exhaust gases and is nearly a linear function of the engine's gross horsepower.) The relatively fast response of the engine speed governor and slower response of the turbocharger when the throttle is advanced make it possible to supply more fuel to the engine than can be burned efficiently with the air available from the turbocharger. As a result, there is a transient imbalance of fuel and air that leads to poor combustion and hence the undesirable emission of visible smoke (i.e., unburned fuel) from the engine exhaust stack.

For the foregoing reasons it is conventional practice to include a time delay or slow rise circuit in the alternator excitation control system so as to delay the application of traction load to the engine in response to any increase of the throttle setting. In one prior art locomotive, the maximum loading rate is limited to (1) a first relatively low, constant value so long as the actual KVA is less than a preselected first amount, (2) another, substantially higher value if the KVA were more than a preselected second amount which is higher than the aforesaid first amount, and (3) a predetermined intermediate value when the KVA is between the preselected first and second amounts. By thus controlling the rate of change of traction power demand following movement of the throttle from an idle or low setting to a higher setting, the engine speed is allowed to increase rapidly to its new setting without overloading the engine, while the engine horsepower (and hence the required amount of fuel) will gradually change, in concert with the increasing supply of air from the more slowly accelerating turbocharger, to the new power setting. Of course any delay in loading undesirably reduces the productivity of the locomotive, and accordingly the loading rate of this prior art locomotive is increased from its initially low value to the aforesaid intermediate value and then to an even higher value as the actual power (and hence the turbo acceleration) attains each of the two progressively higher preselected levels.

There are other known techniques that help to reduce or avoid excessively smoky exhaust during load and speed changes. One is to design the governor to limit the maximum available fuel as a function of manifold air pressure and to call for reduced engine load as the fuel-limit point is approached, thereby. approximating a proper air-to-fuel ratio for complete combustion. This technique is very useful but not perfect because it has a relatively slow response time and because it is difficult to adjust for optimum smoke control over the entire horsepower (i.e., throttle) range.

Another prior art technique for minimizing smoke in the exhaust of a locomotive engine when accelerating is disclosed and claimed in U.S. Pat. No. 3,878,400-McSparran. According to the McSparran patent, when the throttle is advanced to a higher notch the reference voltage that normally determines the power output of the traction alternator will increase to its new value at a predetermined limited rate, and during the transition the alternator excitation is controlled as a function of the turbocharger speed. Consequently the rate at which the engine load actually increases will track the increasing turbocharger speed. When properly applied, this "bootstrapping" method can satisfactorily control smoke during acceleration transients. However, some problems have been encountered in practice due either to variations in the characteristics of different turbochargers or to the variations in turbo performance that can result from ambient temperature or barometric pressure changes.

SUMMARY OF THE INVENTION

A general objective of the present invention is to provide improved means for controlling the rate at which a variable-speed diesel engine is loaded when more power is called for.

A more specific objective is the provision, for a diesel-electric locomotive, of means responsive to any advance in the position of the locomotive throttle for effectively preventing visible smoke in the engine exhaust over a wide range of ambient temperature and a wide range of barometric pressure.

Another objective of the invention is the provision, for a diesel-electric locomotive, of means responsive to any advance in the position of the locomotive throttle for controlling the resulting rate of increase of engine horsepower in a manner that prevents engine bogging and smoke while minimizing the loading time.

In carrying out the invention in one form, a locomotive is provided with a conventional variable speed, multiple cylinder diesel engine having a combustion air intake manifold and an exhaust manifold, and a turbocharger driven by the exhaust gases of the engine supplies pressurized air to the intake manifold. Fuel supply means (including an engine speed regulating governor) controls the injection of diesel fuel into the engine cylinders. Appropriate means are provided for sensing the actual speed of the engine, the barometric pressure (i.e., atmospheric pressure), the air pressure in the intake manifold, and the amount of fuel actually being supplied to the engine.

The locomotive also includes electric power generating means mechanically driven by the diesel engine for supplying current to a plurality of traction motors. Excitation means is provided for controlling the power output of the generating means, and the magnitude of this output (KVA) is sensed by appropriate means. A controller provides a variable engine speed command signal for the fuel supply means and a variable control signal that controls the excitation means. The values of these two signals are normally determined by an associated throttle which has multiple power settings, whereby engine speed (RPM) and power (HP) are both dependent on the throttle power setting. However, to avoid engine bogging and smoke when the power setting is increased and the engine accelerates to a higher speed, the maximum rate at which traction load (KVA) can increase needs to be limited. For this purpose the controller includes improved rate control means for varying the excitation control signal in a manner to control the rate of adding KVA as a function of RPM and HP and also as a function of the combustion air-to-fuel ratio (by weight) of the engine.

More particularly, the rate of load increase is variable in a range between predetermined maximum and minimum limits, and in this range it is proportional to the product of RPM and HP. Thus within its variable range the loading rate automatically increases with the actual speed of the engine and also with the engine's gross horsepower. As a result, the rate of load increase will indirectly track the turbo speed (which, as previously explained, is nearly a linear function of horsepower) and will directly track the engine speed which is proportional to the volume of air displaced by the pistons of the engine cylinders per second. This enables the engine power to increase at an increasing rate commensurate with the increasing amount of combustion air supplied to the cylinders.

Both the "gain" of the rate control means (i.e., the proportionality constant that relates the variable rate of load increase to the magnitudes of HP and RPM) and the maximum loading rate are suitably selected to ensure the desired smoke avoidance in response to any step increase in the power setting of the throttle. Preferably the maximum and minimum limits that define the variable range of the loading rate are respectively raised to somewhat higher levels after the engine has accelerated to its new speed, at which time the engine no longer needs to develop accelerating torque. In order to minimize loading time, the gain is automatically increased to a second, substantially higher number (and the maximum and minimum rate limits are appropriately increased) any time the air-to-fuel ratio increases above a predetermined "no-smoke" threshold (e.g., 13) which ensures sufficient oxidation of the fuel in the engine cylinders to avoid objectionable smoke. The air-to-fuel ratio is indicated by dividing a number representing the amount of combustion air (by weight) displaced per second by the sensed amount of fuel (by weight) that is supplied to the engine per second. Preferably the number representing air is determined by a calculation based on manifold air pressure, barometric pressure, and the "volumetric efficiency" of the engine (which in turn is a known function of manifold pressure and engine speed).

The invention will be better understood and its various objects and advantages will be more fully appreciated from the following description taken in conjunction with the accompanying drawings.

BRIEF DESCRIPTION OF THE DRAWINGS

FIG. 4 is a diagram of an "equivalent circuit" that is used to illustrate the manner in which the alternator field excitation control signal is produced by the controller shown in FIG. 3;

FIG. 5 is a graph of the rate of change of traction load vs. engine speed times gross horsepower to illustrate the operation of the rate limit function in the FIG. 4 diagram;

DESCRIPTION OF THE PREFERRED EMBODIMENT

Figure 1:
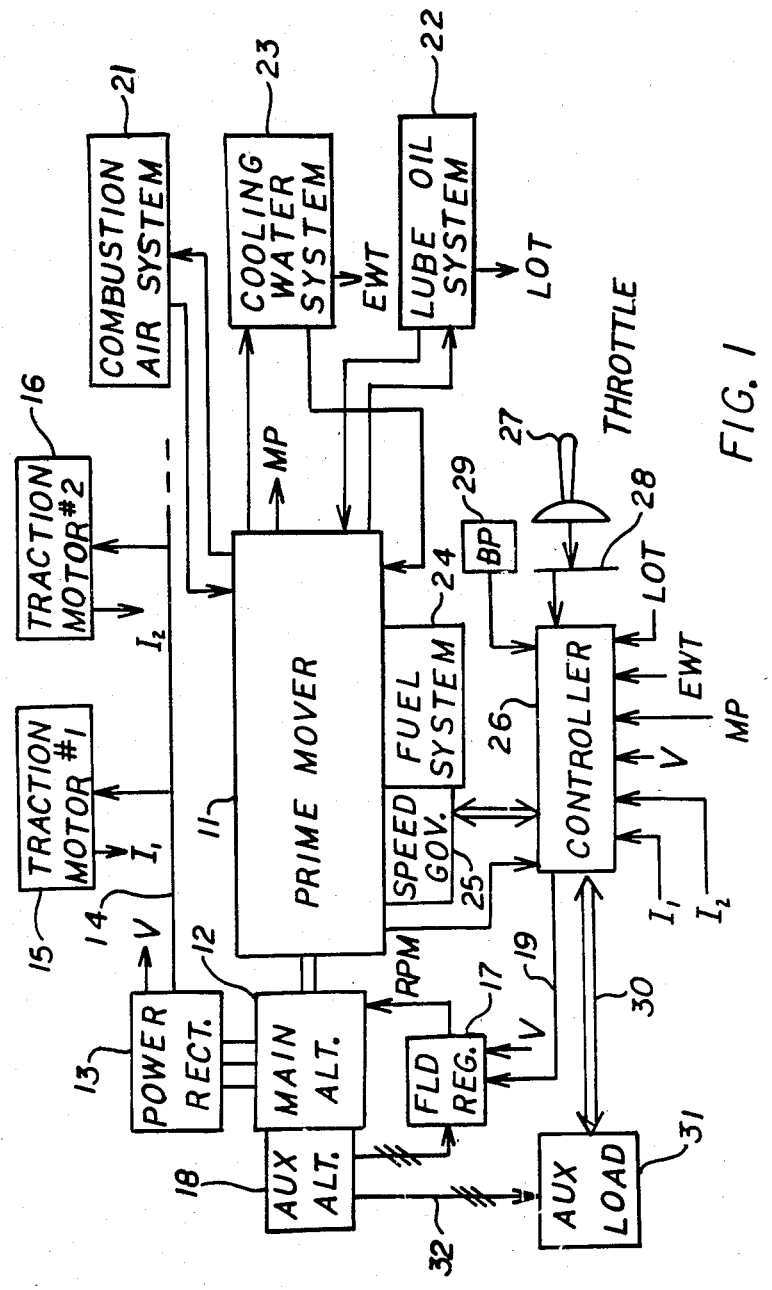
FIG. 1 is a schematic diagram of the principal components of a locomotive propulsion system, including a thermal prime mover (such as a diesel engine), a traction alternator, a plurality of traction motors, and a controller.

The propulsion system shown in FIG. 1 includes a variable-speed prime mover 11 mechanically coupled to the rotor of a dynamoelectric machine 12 comprising a 3-phase alternating current (a-c) synchronous generator, also referred to as the main traction alternator. The 3-phase voltages generated by the main alternator 12 are applied to a-c input terminals of at least one 3-phase, double-way uncontrolled power rectifier bridge 13. The rectified electric power output of the bridge 13 is supplied, via a d-c bus 14, to parallel-connected armature windings of a plurality of d-c traction motors, only two of which (15, 16) are identified in FIG. 1. In practice a traction motor is hung on each axle of the locomotive, there are usually two or three axles per truck, and there are two trucks per locomotive. The motors have field windings (not shown) connected in series with their respective armatures during the motoring or propulsion mode of operation. Alternatively, a-c traction motors could be used, in which case suitably controlled electric power inverters would be connected between the respective motors and the d-c bus 14.

Field windings (not shown) on the rotor of the main alternator 12 are connected for energization to the output of a suitable source 17 of regulated excitation current. Preferably the source 17 comprises a 3-phase controlled rectifier bridge the input terminals of which receive alternating voltages from a prime mover-driven auxiliary alternator 18 that can actually comprise an auxiliary set of 3-phase windings on the same frame as the main alternator 12. This source includes conventional means for varying the magnitude of the direct current that it supplies to the alternator field as necessary to minimize any magnitude difference between a control signal on an input line 19 and a feedback signal V representative of the average magnitude of the output voltage of the power rectifier 13. The latter voltage magnitude is a known function of the field current magnitude and also varies with the speed of the prime mover 11.

The prime mover 11 is a thermal or internal-combustion engine or equivalent. On a self-propelled diesel-electric locomotive, the motive power is typically provided by a high-horsepower, turbocharged, 4-stroke, 16-cylinder diesel engine. Such an engine has a number of ancillary systems that are represented by labeled blocks in FIG. 1. A combustion air system 21 conventionally includes an engine exhaust gas-driven turbocharger for compressing air in the combustion air intake manifold of the engine. A lube oil system 22 conventionally includes an engine crankshaft-driven pump and associated piping for supplying suitable lubricating oil to the various moving parts of the engine. A cooling water system 23 conventionally includes a pump for circulating relatively cool water from a plurality of air-cooled heat exchangers or radiators to a lube oil cooler, to the cylinder liners of the engine for absorbing heat rejected during the combustion process, and also to "intercoolers" through which the combustion air passes after being compressed (and therefore heated) by the turbocharger. These three systems (21-23) are illustrated in more detail in FIG. 2 which will soon be described.

A diesel engine fuel system 24 conventionally includes a fuel tank, fuel pumps and nozzles for injecting fuel oil into the respective power cylinders which are arranged in two rows or banks on opposite sides of the engine, tappet rods cooperating with fuel cams on a pair of camshafts for actuating the respective injectors at the proper times during each full turn of the crankshaft, and a pair of fuel pump racks for controlling how much fuel oil flows into a cylinder each time the associated injector is actuated. The position of each fuel pump rack, and hence the quantity of fuel that is being supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed control signal received from a controller 26, which signal is herein called the speed command signal or the speed call signal.

In a normal motoring or propulsion mode of operation, the value of the engine speed call signal provided by the controller 26 is determined by the position of a handle 27 of a manually operated throttle to which the controller is coupled. A locomotive throttle conventionally has eight power positions or notches (N), plus idle and shutdown. N1 corresponds to a minimum desired engine speed (power), while N8 corresponds to maximum speed and full power. In a consist of two or more locomotives, only the lead unit is usually attended, and the controller on board each trail unit will receive, over a trainline 28, an encoded signal that indicates the throttle position selected by the operator in the lead unit.

As was explained hereinbefore, for each power level of the engine there is a corresponding desired load. The controller 26 is suitably arranged to translate the throttle notch information into a control signal of appropriate magnitude on the input line 19 of the alternator field regulator 17, whereby the traction power is regulated to match the called-for power so long as the alternator output voltage and load current are both within predetermined limits. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine and its support systems.

Figure 2:
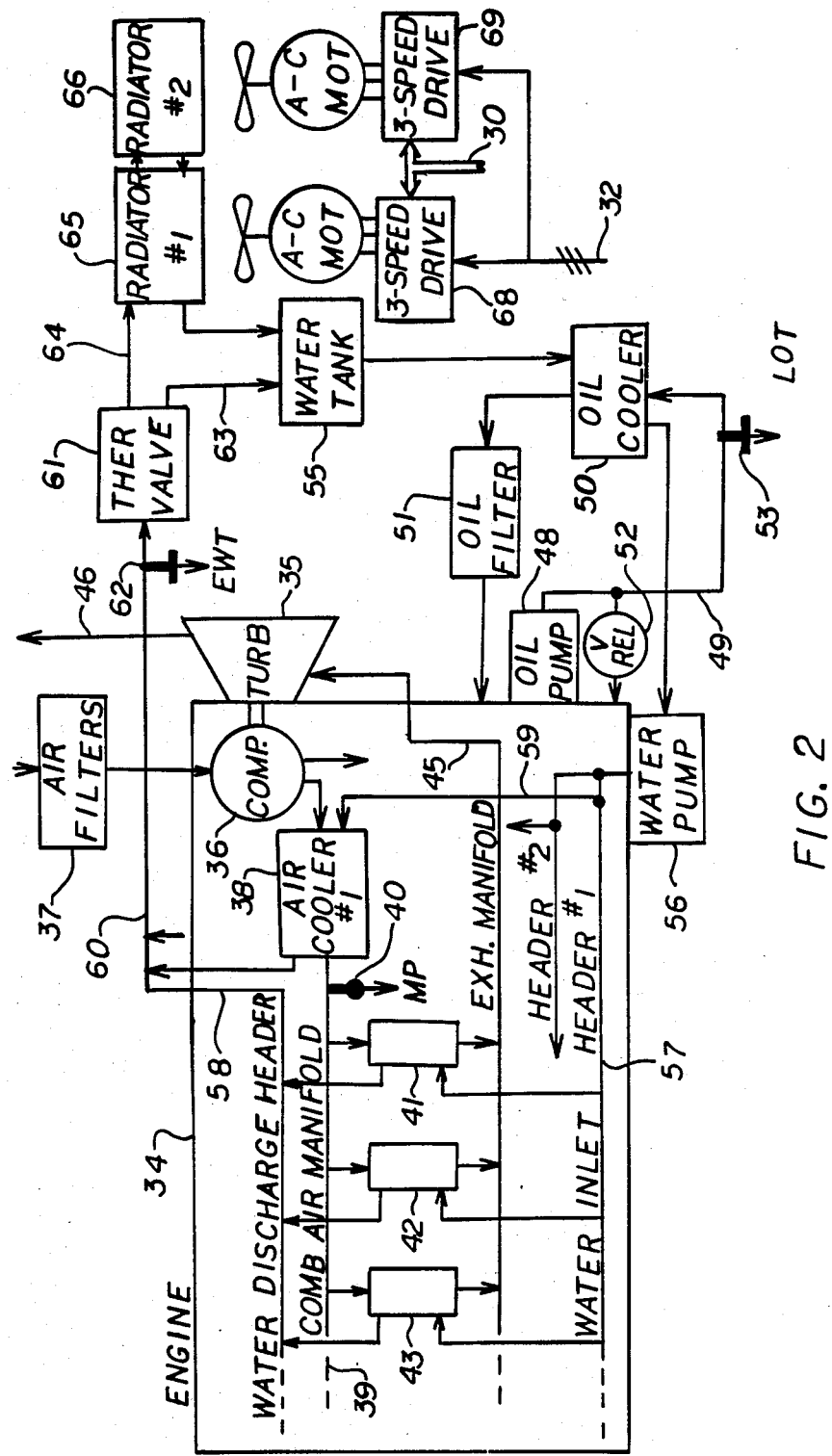
FIG. 2 is a simplified schematic diagram of the locomotive engine and the associated support systems that supply it with combustion air, lubricating oil, and cooling water.

More particularly, the controller 26 typically receives the voltage feedback signal V (representative of the average magnitude of the rectified alternator output voltage), current feedback signals I1, I2, etc. (representative, respectively, of the magnitude of current in the armature windings of the individual traction motors), and a load control signal issued by the governor system 25 if the engine cannot develop the power demanded and still maintain the called-for speed. (The load control signal is effective, when issued, to reduce the magnitude of the control signal on the line 19 so as to weaken the alternator field until a new balance point is reached.) In addition, as is illustrated in FIG. 1, the controller is supplied with an engine speed signal RPM indicating the rotational speed of the engine crankshaft, an ambient air pressure signal BP from a barometric pressure sensor 29, a combustion air pressure signal MP from a pressure sensor associated with an air intake manifold of the engine, an oil temperature signal LOT from a temperature sensor on the hot oil side of the lube oil cooler, and a water temperature signal EWT from a temperature sensor in a hot water section of the cooling water system 23. In response to the latter signal, the controller sends encoded speed control signals, via a multiline serial data link or bus 30, to radiator fan motor(s) that are part of auxiliary load equipment 31 connected for energization, via a 3-wire line 32, to a suitable source of a-c electric power (e.g., the engine-driven auxiliary alternator 18), whereby the flow of air across the heat exchange tubes of the radiators is controlled as a function of water temperature so as to maintain a relatively constant engine operating temperature over the load range of the engine and with wide variations in ambient temperature. FIG. 2 shows the cooling water and combustion air systems in more detail.

In FIG. 2 the diesel engine is represented by the block 34. At one end of the engine, opposite to the alternator end, the turbocharger in the combustion air system is mounted on the engine frame. The turbocharger comprises a gas turbine 35 the output shaft of which drives a centrifugal air compressor 36. Clean air is collected in a plenum, passed through an array of air filters 37, delivered to a central inlet of the compressor 36, and discharged (at elevated pressure and temperature) through alternative peripheral outlets on opposite sides of the engine. The compressed air that is discharged from each of the two outlets passes through an associated air-water heat exchanger (commonly referred to as either an intercooler or an aftercooler) and into a combustion air intake manifold. FIG. 2 shows only one air cooler 38 and one intake manifold 39 on the near side of the engine and does not show the duplicate cooler and the duplicate manifold that are conventionally disposed on the far side. A manifold pressure sensor 40 is connected to the intake manifold 39. From the manifold 39 the compressed air is supplied to a bank of power cylinders on the same side of the engine. While only three cylinders 41, 42, and 43 are shown, in practice each intake manifold supplies combustion air to eight cylinders of a 16-cylinder engine, or six cylinders of a 12-cylinder engine, or four cylinders of an 8-cylinder engine.

The gases produced during combustion are exhausted from each of the cylinders into an exhaust manifold 45. The exhaust gases drive the rotor of the turbine 35 prior to their discharge through an exhaust stack 46 to the atmosphere. Turbine speed increases as the engine develops more power. With the engine running at or near full power, the compressor 36 is effective to compress the combustion air in the intake manifolds (39) to more than twice atmospheric pressure. The intercoolers (38) are then effective to lower the temperature of the compressed air (which was heated appreciably during the compression process), thereby improving thermal efficiency, reducing fuel consumption, and lowering the thermal loading of the engine. In a manner not shown in the drawings, the engine speed governor 25 (FIG. 1) is coupled to the intake manifold pressure sensor 40 and is arranged to limit the amount of fuel supplied to the respective cylinders of the engine 34 if the sensed air pressure is below that required for complete combustion in the engine cylinders.

In the lube oil system that is illustrated in FIG. 2, hot engine lubricating oil from the crankcase near the bottom of the engine 34 is pumped by an engine-driven pump 48 into a pipe 49 connected to the inlet of an oil-water heat exchanger 50, and cooled oil flows from 50 through an oil filter 51 and another pipe to an oil supply header (not shown). From the supply header within the main frame of the engine, the oil is distributed to various bearings, valves, pistons, gears, and other moving parts of the engine for lubricating and/or cooling purposes. A conventional pressure relief valve 52 connects the lube oil pipe 49 to the oil pan, and a temperature sensing device 53 is exposed to the oil flowing in the pipe 49 near the inlet of the oil cooler 50. Preferably the lube oil temperature sensor 53 comprises a conventional thermistor.

As is indicated in FIG. 2, the engine cooling water system comprises a water storage tank 55 from which relatively cool water flows, via heat exchange tubes inside the oil cooler 50, to the suction side of an engine-driven water pump 56. The pump raises the pressure of the water which then flows into a pair of inlet headers on opposite sides of the engine. Water in the first inlet header 57 passes in parallel through the individual cylinder jackets of the bank of cylinders on the near side of the engine to a common water discharge header 58 that is centrally located above the two banks of cylinders. The inlet and discharge headers 57 and 58 are also interconnected by a water branch comprising a pipe 59 and the case of the first combustion air cooler 38. A similar branch enables cooling water to flow from the second inlet header through the second intercooler (not shown) on the far side of the engine. The system is balanced hydraulically so that the flow rate to the two intercoolers is in the desired ratio to the flow rate to the cylinder jackets.

Hot water leaving the engine from the discharge header 58 flows through a pipe 60 to at least one thermostatically controlled bistable fluid valve 61. A temperature sensing device 62 (preferably another thermistor) is exposed to the water flowing in the pipe 60 near the inlet port of the valve 61. The valve 61 has two outlet ports that respectively communicate with two water channels 63 and 64. Whenever the temperature of the water entering the valve is lower than a predetermined threshold, or whenever the water pressure is lower than a predetermined level (i.e., whenever the engine speed is so low that the water pump 56 is unable to raise the water pressure to such a level), all of the water is diverted via the radiator bypass channel 63 to the storage tank 55. Otherwise the water flows into the channel 64 which feeds a bank of two or more water-air heat exchangers or radiators 65 and 66, and after being cooled in these radiators the water is discharged into the tank 55. In practice an additional bank of radiators (not shown), disposed in parallel with the illustrated bank, is connected to a second thermostatically controlled bistable fluid valve whose threshold temperature can differ slightly from that of the first valve 61. The radiators are disposed at a higher elevation than the storage tank 55, and water will quickly and completely drain from them after each cooling cycle. It should be noted here that if and when the radiators 65, 66 are bypassed due to insufficient water pressure (which in turn is due to the engine running at low speed, e.g., under 400 rpm), the water will be cooled while traversing the intercoolers (38) because the combustion air, being only moderately compressed when the turbocharger speed is low (as is true when the engine is lightly loaded) is then cooler than the water. This cooling effect, plus the rejection of heat directly from the engine and its associated cooling water and lube oil systems by radiation and convection, keeps the engine from overheating at low speed.

Cooling air is blown through the radiators by a pair of fans whose blades are respectively driven by two variable speed 3-phase induction motors. Alternating voltages are applied to these fan motors from the respective outputs of a pair of 3-speed motor drive systems 68 and 69. The inputs of both of the latter drives are connected to the line 32 which in turn is energized by the output of an engine-driven auxiliary alternator, whereby the fundamental frequency of the applied voltages (and hence full speed of the fans) tends to vary with engine speed. Each of the drives 68 and 69 is suitably constructed and arranged to reduce this frequency on command so that the associated fan can run at less than full speed. Separate speed commands for the respective drives are provided by the controller 26 (FIG. 1) over the bus 30 in the form of suitably encoded signals that indicate whether full, reduced, or zero speed is desired. Preferably each fan motor drive comprises the improved "cycle-skipping" speed control system that is disclosed and claimed in U.S. Pat. No. 4,461,985 granted on July 24, 1984, to T. D. Stitt and assigned to General Electric Company, and its controls are programmed to provide both half and quarter speed alternatives to full speed.

Figure 3:
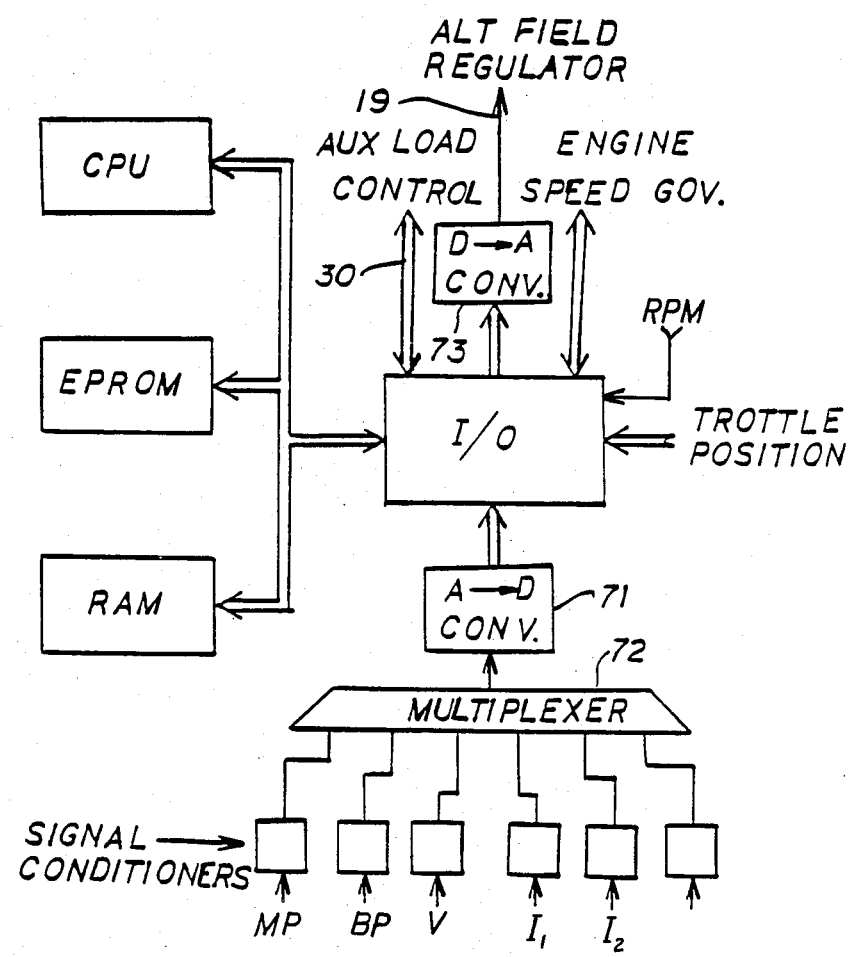
FIG. 3 is an expanded block diagram of the controller (shown as a single block in FIG. 1) which produces output signals for respectively controlling the rotational speed of the engine, the field excitation of the alternator, and the energization of certain auxiliary electrical loads.

In the presently preferred embodiment of the invention, the controller 26 comprises a microcomputer. Persons skilled in the art will understand that a microcomputer is actually a coordinated system of commercially available components and associated electrical circuits and elements that can be programmed to perform a variety of desired functions. In a typical microcomputer, which is illustrated in FIG. 3, a central processing unit (CPU) executes an operating program stored in an erasable and electrically reprogrammable read only memory (EPROM) which also stores tables and data utilized in the program. Contained within the CPU are conventional counters, registers, accumulators, flip flops (flags), etc., along with a precision oscillator which provides a high-frequency clock signal. The microcomputer also includes a random access memory (RAM) into which data may be temporarily stored and from which data may be read at various address locations determined by the program stored in the EPROM. These components are interconnected by appropriate address, data, and control buses. In one practical embodiment of the invention, an Intel 8086 microprocessor is used.

The other blocks shown in FIG. 3 represent conventional peripheral and interface components that interconnect the microcomputer and the external circuits of FIG. 1. More particularly, the block labeled "I/O" is an input/output circuit for supplying the microcomputer with data representative of the selected throttle position and with digital signals representative of the readings of various voltage, current, pressure, temperature, and other sensors associated with the locomotive propulsion system. The latter signals are derived from an analog-to-digital converter 71 connected via a conventional multiplexer 72 to a plurality of signal conditioners to which the sensor outputs are respectively applied. The signal conditioners serve the conventional dual purposes of buffering and biasing the analog sensor output signals. As is indicated in FIG. 3, the input/output circuit also interconnects the microcomputer with the auxiliary load controls (via the multiline bus 30), the engine speed governor, the engine speed sensor, and a digital-to-analog signal converter 73 whose output is connected via the line 19 to the alternator field regulator.

The controller 26 is programmed to produce, on the line 19, a control signal having a magnitude that normally depends on the throttle position selected by the locomotive operator. The manner in which this is accomplished is functionally illustrated in FIG. 4 which will now be briefly described. The throttle position data that the controller receives from the trainline 28 (FIG. 1) are fed to a "decoder" functional block 87 which translates this data into appropriate binary numbers on dual output channels 88 and 89. The number on the first channel 88 corresponds to the optimum amount of power that the engine 11 of a particular locomotive can develop per powered axle at whatever engine speed is being requested by the throttle 27, whereas the number on the second channel 89 establishes the nominal voltage (and current) limit of the traction alternator 12 for the same locomotive and the same throttle position. In accordance with conventional practice, the common voltage and current limits on the channel 89 do not change proportionately to the eight discrete throttle positions. Instead, they are scheduled so that the largest increment of tractive effort is allowed as the throttle handle advances from notch 1 to notch 2, and the smallest increment is realized from notch 7 to notch 8. This will contribute to better wheelslip control as the locomotive accelerates from rest.

The throttle-dependent data from the decoder function 87 are supplied, via the respective channels 88 and 89, to a "deration" functional block 90 which processes such data in accordance with programmed routines that respond to additional data received from other sources. The additional data include: the lube oil temperature indicating signal LOT from the temperature sensor 53 (FIG. 2); the engine cooling water temperature indicating signal EWT from the temperature sensor 62 (FIG. 2); "AUX HP" datum derived from the controls of the auxiliary load equipment 31 (FIG. 1) to indicate the amount of power per axle that the auxiliary loads of the locomotive are actually using; a load control signal LCS derived from the engine speed governor system 25 (normally LCS has a value of one on a per unit basis, but it will decrease whenever a reduction of traction power is necessary to enable the engine to maintain its called-for speed); and relevant data from other selected inputs, as represented in FIG. 4 by the block 91 labeled "other."

As is shown in FIG. 4, the deration function has first and second output channels, labeled "PWR" and "V & I," respectively. A number representing the called-for power output of the main traction alternator per powered axle of the locomotive is provided on the first channel, and a number representing the called-for voltage (and current) limit is provided on the second channel. Under normal operating conditions and assuming no change in auxiliary power, such data track the data on the decoder output channels 88 and 89, respectively. But in response to certain temporary abnormal conditions, as indicated by the values of the signals LOT, EWT and LCS and the data provided by its other inputs, the deration function 90 modifies the throttle-dependent data and calls for a reduced amount of traction power and a lower voltage and current limit.

The call data from the deration function 90 are respectively supplied to dual channels of a "rate limit" functional block 93 in which such data are processed in accordance with programmed routines that respond to additional data received from other sources. The additional data include: the engine speed signal RPM; "fuel rack" datum derived from the engine governor or fuel system to indicate the displacement of the fuel pump rack and hence the amount (pounds per second) of fuel that is actually being supplied to the engine; the combustion air pressure indicating signal MP from the pressure sensor 40 connected to the engine air intake manifold 39 (FIG. 2); the ambient air pressure signal BP from the barometric pressure sensor 29 (FIG. 1); and "HP" datum from a calculation function 94 that is programmed to find the per axle gross horsepower of the engine from the amount of auxiliary load being used and the measured output of the traction alternator 12 (FIG. 1). The rate limit function 93 has first and second output channels, labeled "PWR" and "V & I," respectively. A number representing a reference value of traction power per axle is provided on the first channel, and a number representing a reference value of the common voltage and current limit is provided on the second channel. Under steady state conditions, such reference data are the same, respectively, as the call data on the corresponding output channels of the deration function 90. But in the event of a step change in the call data, the rate limit function 93 prevents the reference data from changing faster than a desired maximum rate. In the case of the power reference, it is additionally effective when more power is called for to control the rate of change as a function of the actual speed and horsepower of the engine. More details of the implementation and operation of this novel power rate-of-change control function of the rate limit block 93 will soon be described with reference to FIGS. 5-7.

As can be seen in FIG. 4, the reference values on the output channels of the rate limit function 93 are respectively supplied to first and second inputs of a block 95 labeled "wheelslip derate, ref limits, and error compensate." This block receives additional data from other sources, including: "WHEELSLIP" data indicating that either a small or a moderate power reduction is required to correct a wheelslip condition and thus restore wheel-rail adhesion; "VOLT MAX" and "CUR MAX" data that establish absolute maximum limits for the alternator output voltage and current, respectively; and "GAINS" data that depend on the throttle position and other parameters of the locomotive and its controls. It also receives a first output signal IMAX from a signal processor 96, an output signal KVA from a multiplying function 97 (illustrated in FIG. 4 by a block labeled "X"), and the voltage feedback signal V that represents the average magnitude of the rectified alternator output voltage. The processor 96 receives as inputs the traction motor armature current feedback signals I1, I2, etc.; it is so constructed and arranged that the value of IMAX is determined by the input signal of highest magnitude. A second output signal IAV of the processor 96 has a value that corresponds to the average magnitude of all of the traction motor currents. In the multiplier 97 the value of the average current signal IAV is multiplied by the value of the voltage feedback signal V, and the resulting product, which is the output of 97, is consequently representative of the kilowatts of power output of the traction alternator 12.

The block 95 is multifunctional. In the course of executing the alternator excitation control program, the reference values at the first and second inputs of the block 95 are modified or derated when a wheelslip condition is detected. The PWR reference input is further modified as a function of any appreciable power unbalance among the various traction motors of the locomotive so as to provide a desired traction power value (per axle) that differs from this input when necessary to correct for such unbalance. The common V & I reference input is deployed to provide separate voltage and current reference values that jointly vary with this input but that have different maximum limits, as established by the VOLT MAX and CUR MAX inputs, respectively.

In other routines carried out in the block 95, the limited current reference value is compared with the actual value of the maximum current signal IMAX to derive a current error value equal to their difference, the limited voltage reference value is compared with the actual value of the alternator voltage feedback signal V to derive a voltage error value equal to their difference, and the desired power value is compared with the actual power demand of the most loaded traction motor, as found by multiplying IMAX by V, to derive a power error value equal to their difference. The three error values are processed in accordance with programmed compensation routines to derive power, voltage, and current control values that are respectively representative of the power, voltage, and current error values. The compensation routines introduce proportional plus integral transfer functions, the respective gains of which are determined by the GAINS data. Thus each control value varies as a function of the time integral of its associated error value. All three of the control values are supplied to a least value gate in the multifunctional block 95. From the least value gate an output signal VC is derived, and accordingly the value of VC corresponds to the smallest control value.

The value of VC determines the magnitude of the analog control signal that the controller 26 supplies, via the line 19, to the alternator field regulator 17 (FIG. 1). The field regulator will respond to the latter signal by varying the field strength of the traction alternator as necessary to minimize and difference between the value of the voltage feedback signal V and the value of the output signal VC. So long as both V and IMAX are within the limit set by the common V & I reference input to the block 95 and are not above their respective maximum limits as established by VOLT MAX and CUR MAX, the value of VC is determined by the power control value which will now be smaller than either the voltage or current control value. Consequently the alternator output voltage is maintained at whatever level results in essentially zero error between actual and desired traction power. But if V (or IMAX) tends to exceed its limited reference value, the voltage (or current) control value is driven lower than the power control value and the value of VC accordingly decreases, whereby the alternator voltage is adjusted to whatever level results in zero error between V (or IMAX) and the limited reference value of voltage (or current).

When the throttle position is advanced from a low power or idle setting to a higher notch, the power reference input to the multifunctional block 95, and hence the desired power value (per axle) from which the power error value is derived in the block 95, increases at a controlled rate determined by the rate limit function 93. Initially the power error value reflects any increment in the desired power value, thereby causing the power control value (and hence the value of the control signal VC) to vary in a sense that calls for more excitation current from the alternator field regulator. The stronger field and the higher speed of the traction alternator in turn cause the power output of the alternator to increase, thereby reducing the power error value. In accordance with the present invention, VC is varied in a manner to control the resulting rate of increase of traction load (KVA) as a function of the speed (RPM) and gross horsepower (HP) of the engine and also as a function of the engine's combustion air-to-fuel ratio (by weight). These functions are illustrated in FIG. 5 for the presently preferred embodiment of the invention.

The power rate control means in the rate limit function 93 will respond to a power-increasing change in the throttle position by increasing the power reference value (and consequently the magnitude of KVA) at a rate which varies, between predetermined minimum and maximum limits, with the product of RPM and HP. So long as the air-to-fuel ratio (A/F) is not above a predetermined "no-smoke" threshold (e.g., 13), the rate control means is characterized by a relatively low "gain" (i.e., the proportionality constant that relates the loading rate to the magnitudes of RPM and HP is a predetermined relatively low number), and in FIG. 5 the variable rate at which the traction load (KVA) increases is illustrated, by way of example, by the solid-line trace labeled "Low Gain while Engine Accelerates to New Speed." Representative minimum (MIN) and maximum (MAX) limits of the variable range of this low-gain loading rate are also depicted in FIG. 5. The rate control means is so arranged that these limits are respectively set at predetermined first and second levels while the engine is accelerating to a new speed (corresponding to the higher throttle notch) and are respectively raised to somewhat higher levels in response to RPM closely approaching the new speed. With the engine at its new speed, the rate of KVA increase varies with the product of RPM and HP in the manner illustrated in FIG. 5 by the broken-line trace which has the same slope but is offset slightly with respect to the solid-line low-gain trace.

To minimize loading time, the power rate control means in the rate limit function 93 is characterized by a relatively high gain whenever A/F is above the no-smoke threshold. The high-gain loading rate is illustrated in FIG. 5 by the appropriately labeled solid-line trace which has a slope substantially higher than the aforesaid low gain. FIG. 5 also illustrates that the minimum and maximum limits are raised from their first and second levels, respectively, to appreciably higher levels in response to A/F increasing above the previously mentioned threshold. This threshold is selected to ensure sufficient oxidation of the fuel in the engine cylinders to avoid objectionable smoke in the engine exhaust, and consequently the rate at which KVA is added can be safely increased from the low-gain line to the high-gain line whenever A/F exceeds the no-smoke threshold.

Figure 6:
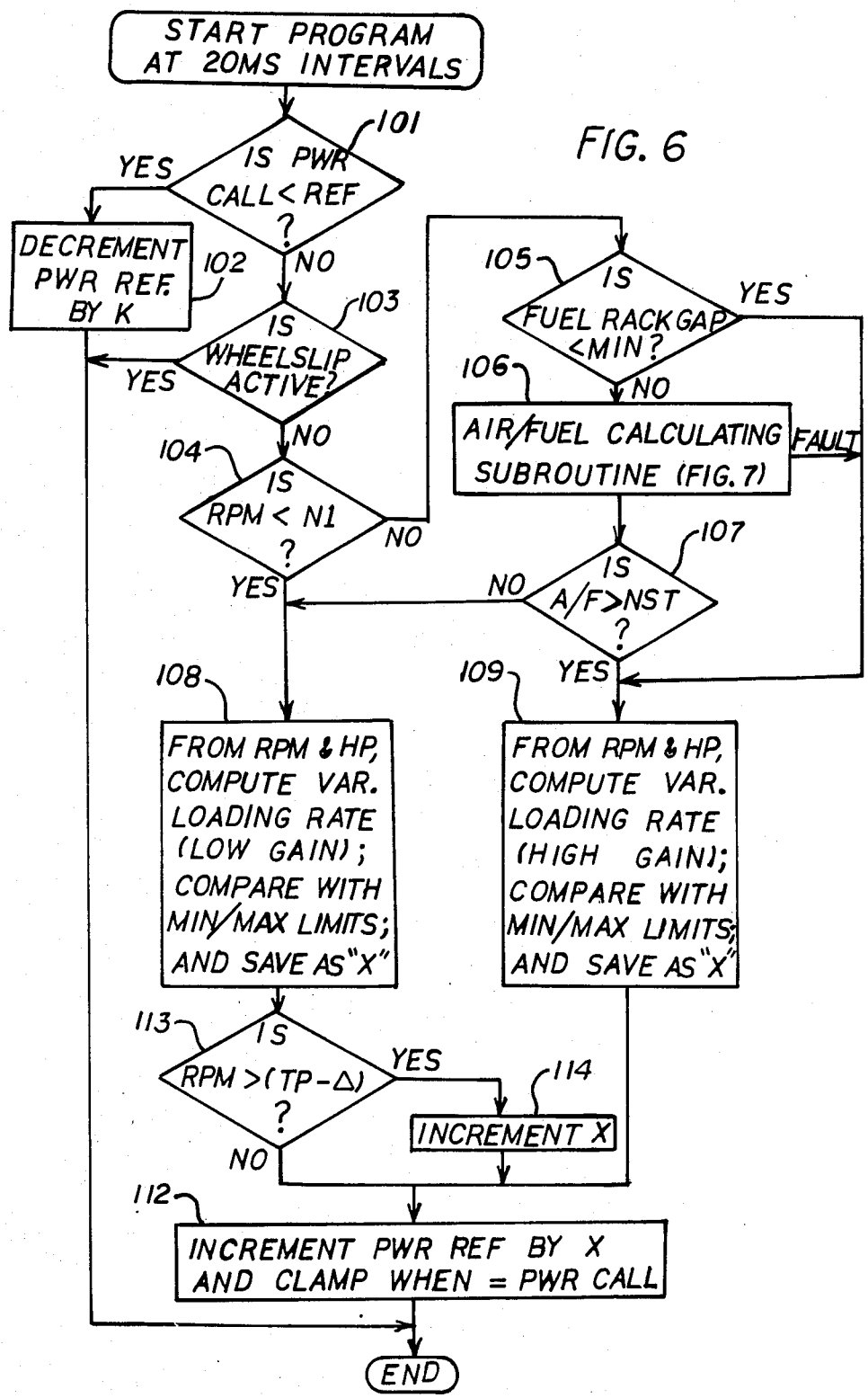
FIG. 6 is a flow chart that explains the preferred manner of controlling the loading rate as functions of engine speed and horespower and of the air-to-fuel ratio.

Although the power rate control function could be implemented in a variety of different ways to obtain the results shown in FIG. 5, the presently preferred way is to program the microcomputer 26 to execute the routine that is illustrated in FIG. 6. This routine is repeated 50 times a second. It starts at an inquiry point 101 which determines whether or not the power call data from the deration function 90 (FIG. 4) is lower than the last power reference value produced by the rate control function. If the answer is affirmative (which indicates that a load reduction is called for), the next and final step 102 in the FIG. 6 routine is to decrement the power reference value by a predetermined constant amount "K." Consequently KVA will decrease at a known, maximum rate so long as the power call is less than the power reference. If, for example, an unloading rate limit of 170 horsepower per second per axle were desired, K would be a number corresponding to a KVA decrement equivalent to one-fiftieth of that limit (i.e., 3.4 HP).

If the answer to inquiry 101 were negative (which indicates that no load reduction is called for) the next step 103 in the power rate control routine would be to test for wheelslip activity. If a significant wheelslip condition is detected, the routine ends here. Alternatively, if the wheelslip data indicates either that no wheel of the locomotive is slipping or that there is only a slight or insignificant wheelslip (i.e., one so minor that the required power reduction is below a predetermined small limit), the routine proceeds from point 103 to another inquiry 104 which tests whether or not the actual speed of the diesel engine, as indicated by the speed feedback signal RPM, is less than the speed commanded when the throttle handle 27 (FIG. 1) is in notch 1. If RPM is less than N1 speed, the routine jumps directly from inquiry point 104 to step 108. Alternatively, the routine proceeds to the step 108 through additional steps 105, 106, and 107.

At step 105 of the power rate control routine, the position of a movable fuel pump rack in the engine fuel system 24 (FIG. 1) is checked. If this reveals that the fuel rack gap is less than a predetermined minimum setting, the rack feedback is faulty, in which case the routine jumps to a step 109. Otherwise, a subroutine 106 is executed.

Figure 7:
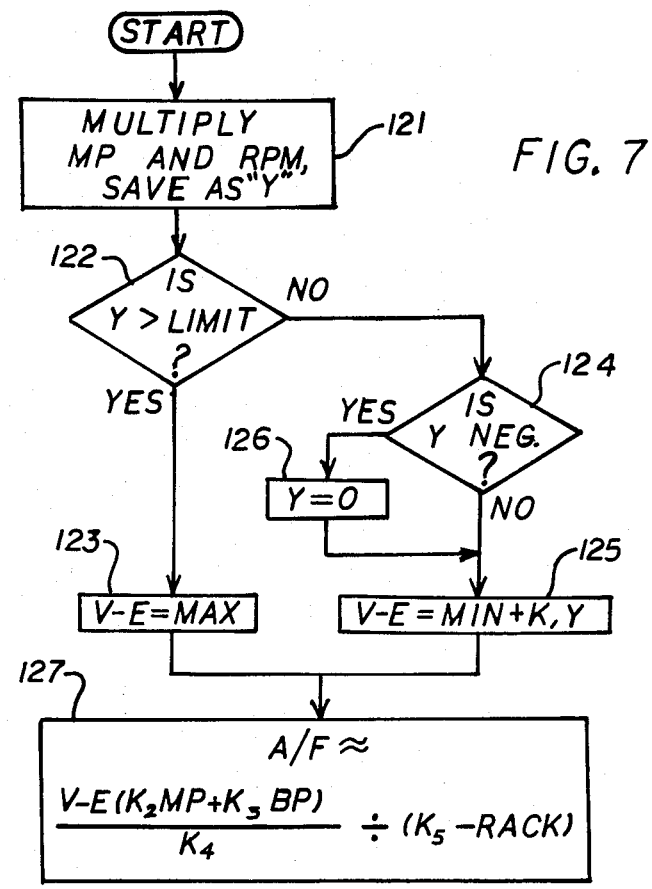
FIG. 7 is another flow chart that explains the operation of the preferred embodiment of the air-to-fuel ratio calculating subroutine shown as a single step in FIG. 6.

The subroutine 106 calculates the ratio, by weight, of combustion air to diesel fuel (A/F) supplied to each cylinder of the locomotive engine. A preferred embodiment of the subroutine 106 is illustrated in FIG. 7 which will soon be described. Assuming the A/F calculation is performed without a fault, the power rate control routine illustrated in FIG. 6 proceeds from step 106 to an inquiry point 107 which compares the indicated ratio with the previously mentioned "no-smoke" threshold (NST). Whenever A/F is not above NST, this inquiry is automatically followed by the step 108, but anytime A/F increases above NST, the routine proceeds from the inquiry 107 to the step 109. Either step 108 or step 109 will determine a number "X" which, when added to the last power reference value produced by the rate control function, will result in a traction load increase equal to one-fiftieth of the desired loading rate (expressed as KVA per axle per second). X is a function of the gross horsepower (HP) and the rotational speed (RPM) of the engine; step 108 is programmed to determine X in accordance with the lower low-gain characteristic shown in FIG. 5, whereas step 109 is programmed to determine it according to the high-gain characteristic shown in FIG. 5.

Steps 108 and 109, which are similar to each other, can be implemented in any one of a variety of different ways. By way of example, one practical way of executing step 109 will now be outlined. First HP and RPM are determined or read. HP is indicated by a separate subroutine (represented in FIG. 4 by the block 94) which adds, on a per axle basis, the traction power output of the engine to the known amount of power that the auxiliary loads of the locomotive are actually using. (To calculate traction power, the electrical output of the main alternator 12 per powered axle is divided by the alternator efficiency, and the quotient is appropriately scaled.) To compute the variable loading rate, HP and RPM are multiplied by one another and their product is compared with predetermined low and high "break points" that are stored in the memory of the microcomputer. In FIG. 5, these low and high break points are designated by the reference characters L and H, respectively. If the product is lower than L, the preset minimum limit of the variable high-gain loading rate (reference number 110 in FIG. 5) is desired, and a number corresponding to one-fiftieth of this minimum is saved as X. If the product is higher than H, the preset maximum limit of the variable high-gain loading rate (reference number 111 in FIG. 5) is desired and a number corresponding to one-fiftieth of it is saved as X. But if the product of HP and RPM is between L and H, L is subtracted from this product, the difference is multiplied by the predetermined high gain (or for step 108, the low gain) that is stored in memory, and the new product is compared with the predetermined high-gain minimum limit (110) that is also stored in the memory of the microcomputer. The new product is the desired variable loading rate per powered axle of the locomotive, and a number corresponding to one-fiftieth of it is saved as X unless the new product is lower than the preset minimum level (110), in which case a number corresponding to one-fiftieth of the latter is saved.

As is illustrated in FIG. 6, step 109 of the power rate control routine is followed by a final step 112 in which the power reference value is incremented by an amount equal to X unless the incremented value would exceed the power call, in which event the power reference is clamped to the called for value. So long as RPM is increasing or HP is increasing and the loading rate is in the variable range between its predetermined minimum and maximum limits, and assuming that A/F stays above its no-smoke threshold (NST), X will be progressively increased on each succeeding pass through the power rate control routine. Consequently the rate of applying load to the engine automatically increases very rapidly. However, if RPM were less than N1 or if A/F were not above NST, the variable loading rate would not increase as rapidly because in this case the "low gain" step 108 will be executed rather than the "high gain" step 109. The gain of step 108 is selected to enable the engine to take on load without objectionable smoke under the worst foreseeable conditions (i.e., operation at high ambient temperatures or altitude or with dirty fuel).

FIG. 6 also illustrates that after the low gain step 108 is executed, an additional inquiry 113 is made, before the final step 112, to determine whether or not the actual speed of the engine has attained a level closely approaching a speed corresponding to the new, higher power setting of the throttle. The target level of speed is equal to the throttle position speed (TP) minus a small delta, and X is kept intact while the engine is accelerating to this level. But once RPM exceeds the target level, the power rate control routine proceeds from inquiry point 113 to step 112 via another step 114 in which X is incremented by a predetermined fraction, thereby raising to somewhat higher levels the variable low-gain loading rate and its limits as illustrated by the broken-line trace in FIG. 5.

Turning to FIG. 7, the presently preferred subroutine for calculating A/F (step 106 of FIG. 6) will now be briefly described. In this subroutine, the first series of steps (reference numbers 121–26) will compute the "volumetric efficiency" of the diesel engine. Volumetric efficiency (V-E) is a known characteristic of the engine. As the product of the engine speed (RPM) and the pressure (MP) in a combustion air intake manifold of the engine increases from zero to a predetermined threshold, V-E tends to increase linearly from a predetermined minimum value to a predetermined maximum value, but as this product continues to increase above its threshold, V-E does not increase significantly beyond its maximum value. In the first step 121 of the V-E computation, MP is multiplied by RPM and by a suitable scaling factor. The resulting product is saved as a number "Y". In the next step 122, Y is compared with a predetermined limit that corresponds to the aforesaid threshold at which V-E attains its maximum value. If Y is above such limit, the FIG. 7 subroutine executes a step 123 in which a temporary register is loaded with the predetermined maximum value of V-E that is stored in the memory of the microcomputer. Alternatively, if not above such limit, Y is tested at an inquiry point 124 to determine whether or not it is negative. If not, the subroutine proceeds to a step 125 which loads the temporary register with a number equal to the sum of the predetermined minimum value of V-E plus a number that varies with Y. This sum approximates the volumetric efficiency of the engine at relatively low speed or low intake manifold pressure. If Y is negative, another step 126 makes it equal to zero for the purpose of step 125.

After executing either step 123 or step 125, the FIG. 7 subroutine proceeds, at step 127, to indicate the air-to-fuel ratio of the engine. To find the amount of combustion air (A), V-E is multiplied by the sum of $K_2MP$ plus $K_3BP$ and divided by $K_4$. In this calculation $K_2$, $K_3$ and $K_4$ are predetermined constants and BP is the ambient air pressure as measured by the barometric pressure sensor 29 (FIG. 1). If desired, $K_4$ can be a number proportional to the sum of another predetermined constant plus the actual air temperature in the intake manifold. To find A/F, A is divided by the amount of fuel (F) being supplied to the engine, and the resulting quotient is multiplied by a suitable scaling factor. F is conveniently calculated by subtracting from a predetermined constant $K_5$ a number (RACK) representing the position of the fuel pump rack in the engine fuel system.

While a preferred embodiment of the invention has been shown and described by way of example, many modifications will undoubtedly occur to persons skilled in the art. For example, instead of switching between the predetermined high-gain and low-gain characteristics of the variable loading rate as a function of whether or not A/F is above its no-smoke threshold, the calculated magnitude of A/F could be used to modulate the loading rate. The concluding claims are therefore intended to cover all such modifications as fall within the true spirit and scope of the invention.

We claim:

1. A locomotive propulsion system comprising a variable-speed, multiple-cylinder diesel engine having a combustion air intake manifold and an exhaust manifold, controllable means for supplying diesel fuel to the engine cylinders, turbocharging means connected to both of the exhaust and intake manifolds of the engine and having a rotatable turbine that is driven by the engine exhaust gases and that in turn drives a centrifugal compressor for supplying pressurized air to the intake manifold, electric power generating means mechanically driven by the engine, excitation means for controlling the power output of the generating means, a plurality of traction motors supplied with electric current from the generating means, means for sensing the magnitude of power output (KVA) of the generating means, means for indicating the power (HP) developed by the diesel engine, throttle means having multiple power settings, and a controller coupled to the fuel supplying means, to the excitation means, to the the KVA sensing means, and to the throttle means and operative to provide a variable engine speed command signal for controlling the fuel supply means and to provide a variable control signal for controlling the excitation means so that both the speed of the engine and the power output of the generating means are normally dependent on the power setting of the throttle means, wherein the controller includes improved rate control means coupled to the engine power indicating means and effective in response to the throttle means advancing to a higher power setting for varying said control signal in a manner to increase KVA at a rate that varies, between predetermined minimum and maximum limits, with HP.

2. The system of claim 1 including means for sensing the actual speed (RPM) of the engine, and in which said rate control means is coupled to said speed sensing means and varies said control signal in a manner to increase KVA at a rate that varies, between said limits, with the product of RPM and HP.

3. The system as in claim 1, in which said rate control means is so arranged that said minimum and maximum limits are respectively set at predetermined first and second levels while the engine is accelerating to a new speed corresponding to the higher power setting of the throttle means and are respectively raised to higher levels in response to the engine speed approaching said new speed.

4. The system of claim 1 including means for indicating the ratio, by weight, of combustion air to diesel fuel supplied to each cylinder of the engine, and in which said rate control means is characterized by a gain that is higher when said ratio is above a predetermined threshold than when said ratio is not above said threshold.

5. The system as in claim 4, in which said rate control means is further arranged so that said minimum and maximum limits are higher when said ratio is above said threshold than when said ratio is not above said threshold.

6. The system of claim 4 including means for sensing the acutal speed (RPM) of the engine, and in which said rate control means is coupled to said speed sensing means and varies said control signal in a manner to increase KVA at a rate that varies, between said limits, with the product of RPM and HP.

7. The system of claim 4 including means for sensing the actual speed (RPM) of the engine and means for sensing the air pressure (MP) in the intake manifold, and in which said air-to-fuel ratio indicating means includes means responsive to RPM and MP for computing the volumetric efficiency of the diesel engine.

8. The system of claim 7 including means for sensing barometric pressure (BP), and in which said ratio indicating means includes means responsive to MP, BP, and said volumetric efficiency for calculating the amount of combustion air supplied to each cylinder.

9. The system as in claim 8, in which said rate control means is coupled to said speed sensing means and varies said control signal in a manner to increase KVA at a rate that varies, between said limits, with the product of RPM and HP.

10. The system of claim 7 wherein the engine fuel supplying means includes a movable fuel pump rack and the system includes means for indicating the position of the rack, and wherein said ratio indicating means includes means responsive to the indicated position of the fuel pump rack for calculating the amount of fuel supplied to each cylinder.

11. The system of claim 1 wherein the controller includes means associated with said rate control means and responsive to the power setting of the throttle means for deriving a power reference value that establishes the desired magnitude of electric power output of the generating means, said power reference value being normally dependent on the power setting of the throttle means and increasing, when the power setting is advanced, at a rate controlled by said rate control means.

12. The system of claim 11 wherein said power reference value deriving means includes a deration function which is effective when certain abnormal system conditions are detected to reduce said reference value and thereby reduce the power output of the generating means.

13. A locomotive propulsion system comprising a variable-speed, multiple-cylinder diesel engine having a combustion air intake manifold and an exhaust manifold, controllable means for supplying diesel fuel to the engine cylinders, turbocharging means connected to both of the exhaust and intake manifolds of the engine and having a rotatable turbine that is driven by the engine exhaust gases and that in turn drives a centrifugal compressor for supplying pressurized air to the intake manifold, means for sensing the actual speed (RPM) of the engine, electric power generating means mechanically driven by the engine, excitation means for controlling the power output of the generating means, a plurality of traction motors supplied with electric current from the generating means, means for sensing the magnitude of power output (KVA) of the generating means, throttle means having multiple power settings, and a controller coupled to the fuel supplying means, to the excitation means, to the KVA sensing means, and to the throttle means and operative to provide a variable engine speed command signal for controlling the fuel supply means and to provide a variable control signal for controlling the excitation means so that both RPM and KVA are normally dependent on the power setting of the throttle means, wherein the controller includes improved rate control means coupled to said speed sensing means and effective in response to a power-increasing change in the setting of the throttle means for varying said control signal in a manner to control the resulting rate of change of KVA as a function of RPM.

14. The system of claim 13 wherein the controller includes means associated with said rate control means and responsive to the power setting of the throttle means for deriving a power reference value that establishes the desired magnitude of electric power output of the generating means, said power reference value being normally dependent on the power setting of the throttle means and increasing, when the power setting is increased, at a rate controlled by said rate control means.

15. The system of claim 13 including means for indicating the power (HP) developed by the diesel engine, and in which said rate control means is coupled to said engine power indicating means and varies said control signal in a manner to control the resulting rate of change of KVA as a function of the product of RPM and HP.

16. The system of claim 15 including means for indicating the ratio, by weight, of combustion air to diesel fuel supplied to each cylinder of the engine, and in which said rate control means is characterized by a gain that is higher when said ratio is above a predetermined threshold than when said ratio is not above said threshold.

17. The system as in claim 16, in which KVA is increased at a rate that varies, between predetermined minimum and maximum limits, with the product of RPM and HP and in which said rate control means is further arranged so that said minimum and maximum limits are raised from first and second levels, respectively, to higher levels in response to said ratio increasing above said threshold.

* * * * *